(12) United States Patent
You et al.

(10) Patent No.: US 11,815,602 B2
(45) Date of Patent: Nov. 14, 2023

(54) GRID OCCUPANCY MAPPING USING ERROR RANGE DISTRIBUTION

(71) Applicant: Intel Corporation, Santa Clara, CA (US)

(72) Inventors: Ganmei You, Beijing (CN); Zhigang Wang, Beijing (CN); Dawei Wang, Beijing (CN); Hu Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 16/644,118

(22) PCT Filed: Oct. 3, 2017

(86) PCT No.: PCT/CN2017/105245
§ 371 (c)(1),
(2) Date: Mar. 3, 2020

(87) PCT Pub. No.: WO2019/068214
PCT Pub. Date: Apr. 11, 2019

(65) Prior Publication Data
US 2020/0271787 A1    Aug. 27, 2020

(51) Int. Cl.
*G01S 17/89* (2020.01)
*G06T 7/521* (2017.01)
(Continued)

(52) U.S. Cl.
CPC ............ *G01S 17/89* (2013.01); *G01S 7/4873* (2013.01); *G01S 7/4913* (2013.01);
(Continued)

(58) Field of Classification Search
None
See application file for complete search history.

(56) References Cited

U.S. PATENT DOCUMENTS

| | | | | |
|---|---|---|---|---|
| 8,805,858 B1* | 8/2014 | Ray | ......................... | G06F 16/29 |
| | | | | 707/754 |
| 9,689,984 B1* | 6/2017 | Breiholz | ................. | G06T 11/60 |

(Continued)

FOREIGN PATENT DOCUMENTS

CN      109516990 A    *    3/2019    ........... C07D 487/04

OTHER PUBLICATIONS

Thrun, Sebastian et al., "Integrating Grid-Based and Topological Maps for Mobile Robot Navigation", Aug. 1996, AAAI (Year: 1996).*

(Continued)

*Primary Examiner* — Yuqing Xiao
*Assistant Examiner* — Brian Zawacki
(74) *Attorney, Agent, or Firm* — Banner & Witcoff Ltd.

(57) ABSTRACT

A technology is described for mapping a physical environment. An example method may include receiving laser point data for laser light reflected from the physical environment and detected by a laser sensor. Points included in the laser point data can be correlated to grid cells in an environment map that represents the physical environment. Error ranges for the points correlated to the grid cells can be determined based in part on an error distribution. Occupation probabilities can then be calculated for the grid cells in the environment map using an interpolation technique and grid cell occupation probabilities for adjacent error grid cells selected based in part on the error ranges of the points, and the grid cells in the environment map can be updated with the occupation probabilities.

19 Claims, 7 Drawing Sheets

(51) Int. Cl.
*G01S 17/931* (2020.01)
*G01S 7/4913* (2020.01)
*G01S 7/487* (2006.01)
*G01S 7/497* (2006.01)

(52) U.S. Cl.
CPC ............ *G01S 17/931* (2020.01); *G06T 7/521* (2017.01); *G06T 2207/20212* (2013.01)

(56) References Cited

U.S. PATENT DOCUMENTS

| | | | |
|---|---|---|---|
| 10,024,964 B2* | 7/2018 | Pierce | G01S 7/4817 |
| 10,459,084 B2* | 10/2019 | Chen | G01S 17/88 |
| 10,496,104 B1* | 12/2019 | Liu | G06T 5/006 |
| 2006/0125680 A1 | 6/2006 | Thackray | |
| 2008/0027591 A1* | 1/2008 | Lenser | G05D 1/0038 |
| | | | 701/28 |
| 2016/0086318 A1* | 3/2016 | Hannuksela | G01S 17/86 |
| | | | 348/43 |
| 2016/0378115 A1 | 12/2016 | Yoo et al. | |
| 2017/0261996 A1 | 9/2017 | Trehard et al. | |
| 2017/0269201 A1 | 9/2017 | Adachi et al. | |
| 2018/0120116 A1* | 5/2018 | Rombouts | G01S 17/89 |
| 2018/0281680 A1* | 10/2018 | Gerardo Castro | G06N 7/005 |
| 2018/0306587 A1* | 10/2018 | Holz | G01C 21/206 |
| 2020/0329215 A1* | 10/2020 | Tsunashima | H04N 13/204 |

OTHER PUBLICATIONS

"Digital Image Interpolation", Sep. 14, 2017, Cambridge in Color (Year: 2017).*
Screen Capture establishing proof of publishing date. (Year: 2023).*
Machine Translation of CN 106516990 A (Year: 2017).*
https://en.wikipedia.org/wiki/Bilinear_interpolation; accessed Jul. 21, 2017 and May 10, 2020.
https://en.wikipedia.org/wiki/Bicubic_interpolation; accessed Jul. 21, 2017 and May 10, 2020.
International Search Report dated Jul. 11, 2018, in International Application No. PCT/CN2017/105245, filed Oct. 3, 2017; 9 pages.

* cited by examiner

US 11,815,602 B2

GRID OCCUPANCY MAPPING USING ERROR RANGE DISTRIBUTION

PRIORITY INFORMATION

This application is a 371 U.S. national stage entry of PCT Application Serial No. PCT/CN2017/105245, filed Oct. 3, 2017, which is incorporated herein by reference in its entirety.

BACKGROUND

LIDAR (e.g., Light Detection And Ranging, or Light Imaging, Detection, And Ranging) is a technique used to measure a distance to a target by illuminating the target with laser light, and measuring reflected laser light detected using a laser sensor. Differences in laser light return times and wavelengths detected by the laser sensor can be used to create digital representations of the target. LIDAR technology can be used in robotics to obtain a perception of a physical environment. For example, LIDAR output may be used to determine where potential obstacles exist in a physical environment and where a robot is located in relation to the potential obstacles. LIDAR technology can be used by autonomous vehicles for obstacle detection and avoidance to navigate through physical environments.

Simultaneous Localization and Mapping (SLAM) is a computational problem of constructing or updating a map of an unknown environment while simultaneously keeping track of an agent location within the environment. LIDAR SLAM techniques can be used to build environment maps using laser point data obtained from a LIDAR device. One example of a SLAM technique includes scan-to-map matching, which constructs an environment map gradually by matching scan data to previous scan data. In scan-to-map matching, a 2D (two-dimensional) grid map is used to represent a 2D environment. A grid cell may be occupied if a part of an object is detected within the grid cell. A probability that a grid cell is occupied (occupation probability) is inferred in the mapping.

BRIEF DESCRIPTION OF THE DRAWINGS

Features and advantages of technology embodiments will be apparent from the detailed description which follows, taken in conjunction with the accompanying drawings, which together illustrate, by way of example, embodiment features; and, wherein.

DESCRIPTION OF EMBODIMENTS

Figure 1:
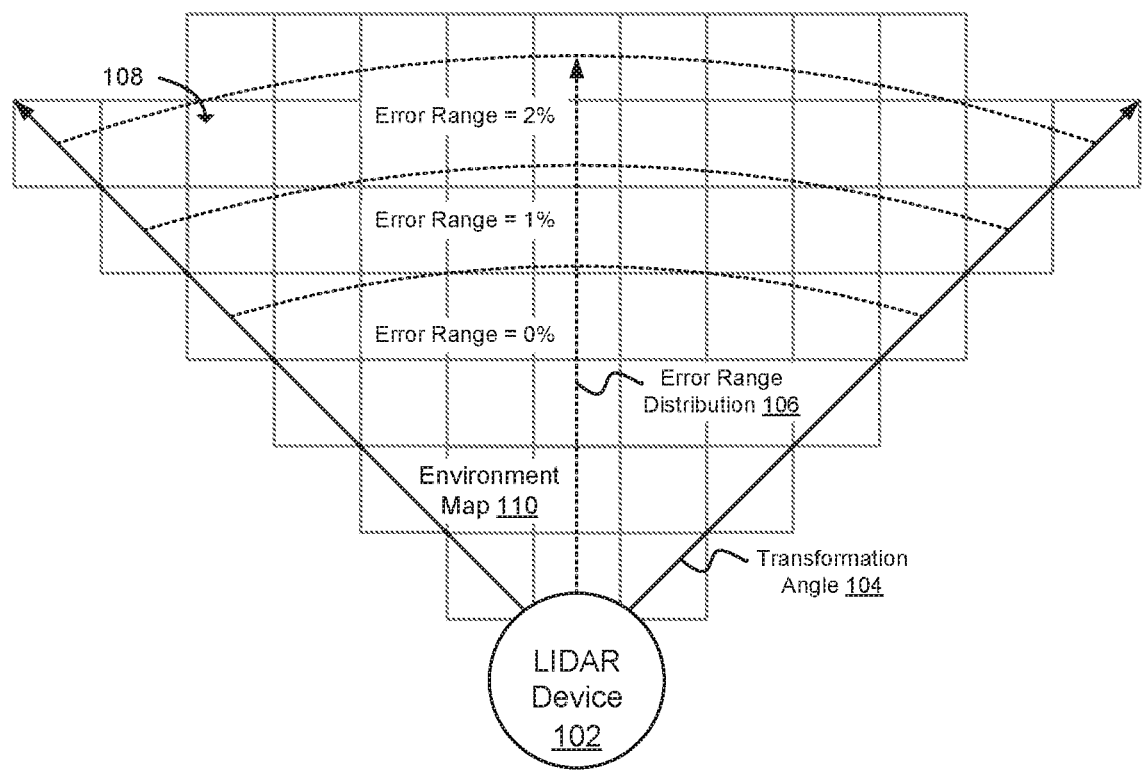
FIG. 1 is a block diagram illustrating a high-level example of a LIDAR device used to map a physical environment using laser point data and an error range distribution.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall concepts articulated herein, but are merely representative thereof.

As used in this written description, the singular forms "a," "an" and "the" include express support for plural referents unless the context clearly dictates otherwise. Thus, for example, reference to "a network" includes a plurality of such networks.

Reference throughout this specification to "an example" means that a particular feature, structure, or characteristic described in connection with the example is included in at least one technology embodiment. Thus, appearances of the phrases "an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various technology embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of technology embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing," and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a system, apparatus, device, component, or activity that is measurably different from other systems, apparatuses, devices, components, or activities in a surrounding or adjacent area, in a single device or in multiple comparable entities, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

A technology is described for mapping a physical environment using different scan-to-map methods selected, based in part, on hardware measurement errors. A LIDAR device can be configured to map an unknown environment using laser point data and predefined error ranges associated with hardware measurement errors. Different scan-to-map methods can be used to match the laser point data to an environment map based on an error range of a laser point. In scan-to-map matching, a 2D grid map is used to represent a 2D environment. A grid cell in the grid map is occupied when a portion of an object is determined to be within the grid cell. The probability of each cell being occupied is inferred in the grid map using occupation probabilities. The technology calculates an occupation probability for a grid cell by first calculating occupation probabilities for each laser point contained within the grid cell based on an error range associated with each laser point, and then summing the occupation probabilities for the environment map. The occupation probability for the grid cell can be used to update an environment map, which can be used, for example, to determine a robot pose or navigate through an unknown environment.

Many mapping methods assume that laser point data (distance and angle) are accurate. However, hardware measurement errors can result in inaccurate laser point data. For example, a laser sensor used in triangulation based LIDAR can generate angle measurement errors that result in a distance and angle deviation of an object point. The deviation increases with distance from the object point. Hardware measurement errors may be more prevalent in some low cost LIDAR systems, resulting in inaccurate laser point data and inaccurate environment mapping. The present technology provides solutions to inaccurate environment mapping associated with hardware measurement errors.

To further describe the technology, examples are now provided with reference to the figures. FIG. 1 is a diagram illustrating an example of a LIDAR apparatus or device 102 mapping a physical environment using laser point data and an error range distribution 106. In one example, the LIDAR apparatus or device 102 may be configured to calculate occupation probabilities for grid cells 108 included in an environment map 110. The environment map 110 may include a 2D grid map used to represent a 2D physical environment. The grid cells 108 included in the environment map 110 may be associated with occupation probabilities that represent a probability that a grid cell 108 is occupied (at least partially) by an object. More specifically, an occupation probability for a grid cell 108 indicates whether a physical space represented by the grid cell 108 may at least be partially occupied by a physical object.

An error range distribution 106 can be used to calculate occupation probabilities for grid cells 108 included in an environment map 110. The error range distribution 106 may specify a range of distances from a laser sensor (included in a LIDAR apparatus or device 102) to points of distance that are associated with hardware measurement errors, such as angle measurement errors that result in distance and angle deviations of object points. Because hardware measurement errors increase with distance, an error range distribution 106 may specify error ranges for different distances associated with hardware measurement errors. For example, an error range distribution 106 may include a first range (e.g., less than 5 meters) within which no hardware measurement errors occur, a second range (e.g., between 5 and 6 meters) within which a specified hardware measurement error may occur (e.g., a one percent distance error), a third range (e.g., between 6 and 7 meters) within which another specified hardware measurement error may occur (e.g., a two-percent distance error), and so on.

The LIDAR apparatus or device 102 may be configured to scan a physical environment using laser light and detect the laser light reflected from the physical environment using a laser sensor. The detected laser light may be converted to laser point data comprising a distance from the laser sensor to a target (e.g., a Cartesian coordinate (x, y) measurement). In scan-to-map matching, laser point data generated by the LIDAR apparatus or device 102 may be for a portion of a physical environment identified using a transformation angle 104. For example, an area of a physical environment that corresponds to a transformation angle 104 may be scanned by the LIDAR apparatus or device 102 and laser point data for the area may be generated. Laser point data generated by the LIDAR apparatus or device 102 can be used to create an environment map 110 that represents the physical environment. More specifically, the environment map 110 can be created by calculating an occupation probability for grid cells 108 included in the environment map 110 using the laser point data and the error range distribution 106. The occupation probabilities can be used to create and update the environment map 110 using the method described below.

Figure 2:
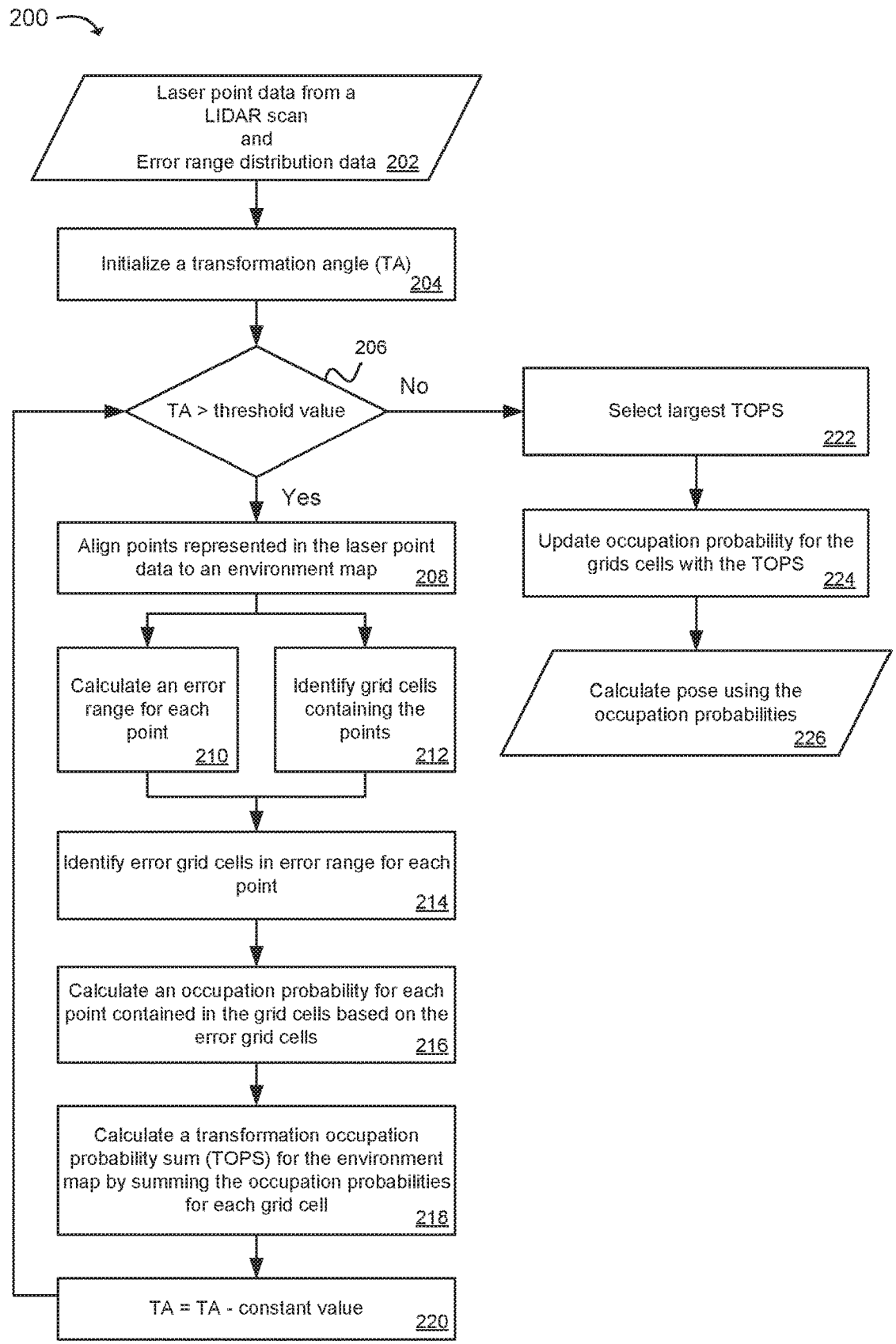
FIG. 2 is a flow diagram that illustrates an example method for calculating occupation probabilities for grid cells in an environment map.

FIG. 2 is a flow diagram illustrating an example method 200 for calculating occupation probabilities for grid cells in an environment map. As in block 202, the method includes obtaining laser point data generated from a LIDAR scan of a physical environment and error range distribution data specifying error ranges for different distances associated with hardware measurement errors. As in block 204, a transformation angle may be initialized. The transformation angle may correspond to the LIDAR scan of the physical environment, that is, the area of the physical environment scanned using laser light and a laser sensor included in a LIDAR apparatus or device. Laser point data generated by the LIDAR scan and the error range distribution data can be used to calculate occupation probabilities for the grid cells in the environment map that correspond to the area included within the transformation angle. The method 200 iteratively calculates occupation probabilities for the grid cells included in the area of the transformation angle, updates the transformation angle by decreasing the transformation angle by a constant value, and then calculates the occupation probabilities for the grid cells included in the area of the updated transformation angle, as explained below.

The laser point data generated by the LIDAR scan can include data for individual laser points detected by the laser sensor. The laser point data can be aligned to points on the environment map, as in block 208, by converting physical environment coordinates of the laser points to environment map coordinates, forming transformation points. The transformation points can be used to represent the laser points detected by the laser sensor, and the transformation points can be aligned to the environment map using the coordinates of the transformation points.

As in block 210, an error range for each transformation point may be calculated using the error range distribution data. As described above, the error range distribution data includes error ranges associated with hardware measurement errors. An error range included in the error range distribution data may represent a point of distance from the LIDAR sensor where measurement errors may occur. As an example, coordinates for a transformation point can be used to determine a distance of the transformation point from the LIDAR sensor, and the distance of the transformation point can be used to identify an error range that corresponds to the distance of the transformation point. The distance of the error range can be scaled to the environment map. Also, an error range included in the error range distribution data may be associated with a measurement error (e.g., an angle error and/or a distance error associated with measuring a laser point). As an example, an error range may be associated with a measurement error percentage. Accordingly, an error range may specify a point of distance from a laser sensor and specify a measurement error associated with the point of distance. Illustratively, an error range that corresponds to a distance from the laser sensor where measurement areas may not occur may not specify a measurement error, or the measurement error may be zero.

Each transformation point aligned to the environment map may be contained within a grid cell on the environment map. A grid cell can contain multiple transformation points. As in block 212, grid cells containing transformation points may be identified, and an association can be created between a grid cell and transformation points contained within the grid cell. For example, map coordinates for a transformation point can be used to identify a grid cell on the environment map that contains the transformation point, and an association between the grid cell and the transformation point can be created.

As in block 214, error grid cells can be identified for each transformation point. The error grid cells may be adjacent grid cells to a grid cell occupied by a transformation point, and occupation probabilities of the error cells can be used in an occupation probability calculation for a grid cell containing a transformation point. The error grid cells can be identified based on an error range of a transformation point contained in the grid cell. For example, an interpolation technique used to calculate an occupation probability for a grid cell containing a transformation point can be selected based on the error range of the transformation point.

Figure 3:
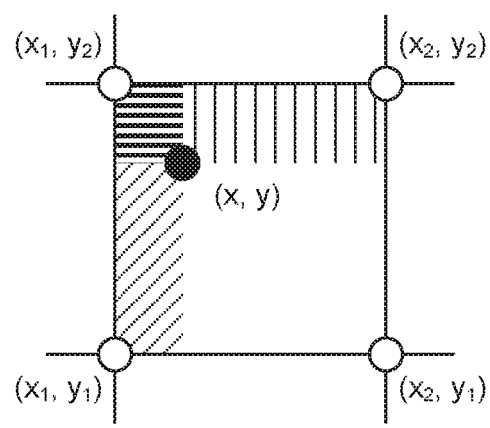
FIG. 3 is a diagram illustrating calculation of the occupation probability of a grid cell using bilinear interpolation.

In one example, bilinear interpolation can be used to calculate occupation probability for grid cells when an error range for a transformation point is associated with a measurement error of zero. In other words, bilinear interpolation can be used for calculating occupation probability for transformation points located in an area of the environment map where no measurement error occurs. As a non-limiting example, distances shorter than 5 meters from a laser sensor may not be associated with measurement errors, and as such, transformation points located within these distances may have error ranges that are zero. Whereas distances beyond 5 meters from the laser sensor may be associated with measurement errors, and therefore, transformation points located within these distance may have error ranges that are greater than zero. Bilinear interpolation is a technique for interpolating functions of two variables (e.g., x and y) on a rectilinear 2D grid. Bilinear interpolation may use a nearest neighbor technique to calculate occupation probabilities for grid cells. For example, as illustrated in FIG. 3, using bilinear interpolation, the occupation probability of the point (x,y) is calculated using the nearest error grid cells (e.g., the closest two-by-two error grid cells).

Figure 4:
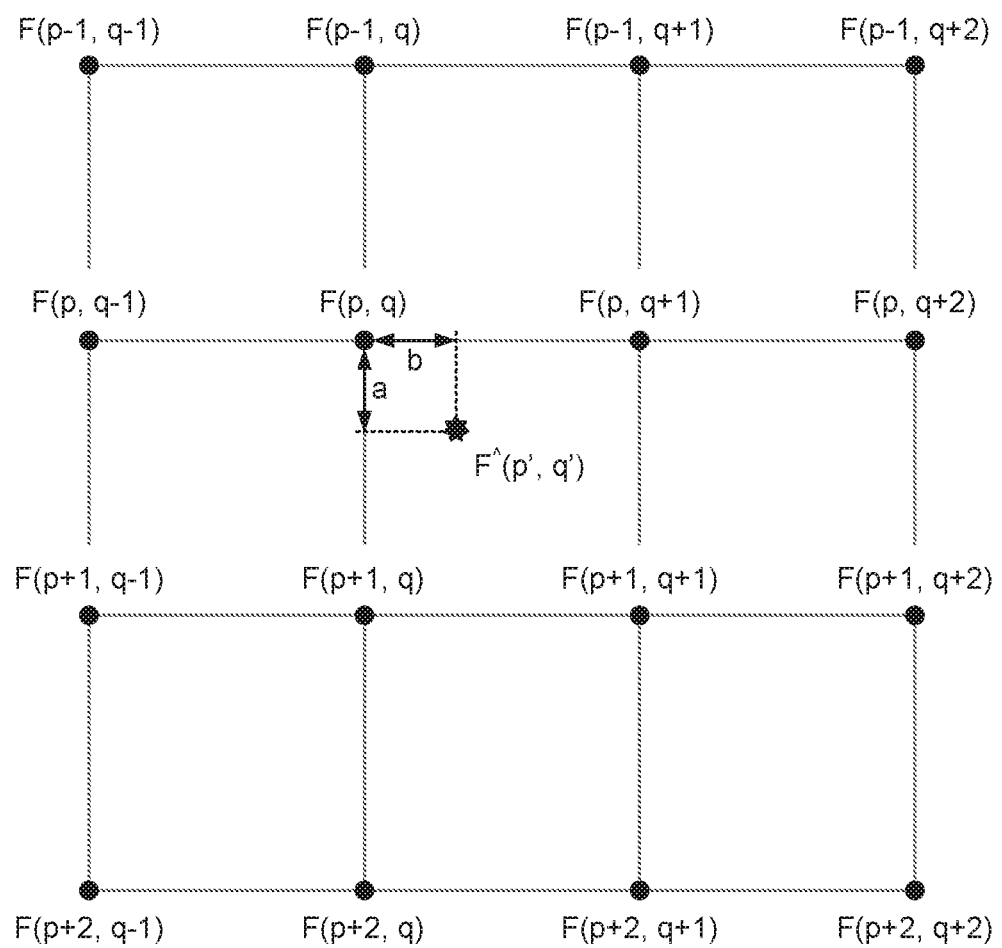
FIG. 4 is a diagram that illustrates calculation of the occupation probability of a grid cell using bicubic interpolation.

Bicubic interpolation can be used to calculate occupation probability for grid cells when an error range for a transformation point is associated with a measurement error greater than zero. That is, bicubic interpolation can be used for transformation points located in an area of the environment map where measurement errors may occur. Bicubic interpolation is used for interpolating data points on a two-dimensional regular grid. A number of adjacent error grid cells selected using bicubic interpolation may be determined using a deviation for a transformation point, where the number of the adjacent error cells selected corresponds to the size of the deviation. A distance deviation and an angle deviation can be used to select the number of the adjacent error cells. As a non-limiting example an environment map scaled to a 5 centimeter resolution may represent that distances of 5 centimeters from a laser sensor are associated with a measurement error. A transformation point having a calculated error range of 2% at the distance of 5 centimeters has a 10 centimeter deviation. As illustrated in FIG. 4, because the resolution of the environment map is 5 centimeters, error grid cells within a 10 centimeter range of the transformation point (e.g., 9 error grid cells) may be selected.

After the error grid cells in error range of a transformation point have been selected, an occupation probability for a grid cell containing the transformation point can be calculated based on the occupation probabilities of the adjacent error grid cells, as in block 216. An interpolation technique can be used to calculate the occupation probability for the grid cell. For example, as described above, where a transformation point has an error range of zero, bilinear interpolation can be used to calculate an occupation probability for the grid cell containing the transformation point. Illustratively, bilinear interpolation uses the occupation probability values of the nearest error grid cells to calculate an occupation probability of a grid cell by calculating a weighted average of the occupation probabilities to arrive at a final interpolated value. A weight for each of the error grid cells may be based on the error grid cells' distance from the transformation point. Where a transformation point has an error range greater than zero, bicubic interpolation can be used to calculate an occupation probability for the grid cell containing the transformation point. Illustratively, bicubic interpolation can be performed using Lagrange polynomials, cubic splines, or a cubic convolution method.

An occupation probability can be calculated for each transformation point included in a grid cell as described above. For example, a grid cell can contain multiple transformation points. An occupation probability can be calculated for each of the transformation points contained in the grid cell. After calculating an occupation probability for each transformation point contained in the grid cell, as in block 218, a transformation occupation probability sum (TOPS) can be calculated for the environment map by summing the occupation probabilities calculated for each transformation point contained in the grid cell. As a simplified illustration, the method 200 may rotate the transformation points in a grid cell five times using five transformation angles. With each rotation, occupation probabilities of the grid cells are summed to form a TOPS for the environment map.

A TOPS can be calculated for the environment map that corresponds to a transformation angle. After calculating a TOPS for the environment map using the transformation angle, the TOPS for the environment map can be stored in memory and, as in block 220, the transformation angle can be decreased by a constant value and another iteration of calculating a TOPS for the environment map using the transformation angle can be performed, until as in block 206, a determination is made that the transformation angle is larger than a threshold value.

After iterating through the transformation angle to calculate the TOPS for the environment map, as in block 222, the largest TOPS value for the environment map can be selected. In one example, as described above, for each iteration of the transformation angle, a TOPS value calculated for the environment map can be preserved in memory and the TOPS values can be compared to determine the largest TOPS value for the environment map. In another example, after each iteration of the transformation angle, a current TOPS value calculated for the environment map can be compared to a last TOPS value for the environment map stored in memory, and the largest TOPS value between the current TOPS and the last TOPS can be preserved in memory.

As in block 224, the environment map can be updated by setting the occupation probabilities for the grid cells in the environment map to the largest TOPS values selected above. As a result, the environment map is updated to represent the physical environment detected using the LIDAR scan. As in block 226, the occupation probabilities in the updated environment map can be used to calculate a robot pose, navigate through the physical environment, or the like.

Figure 5:
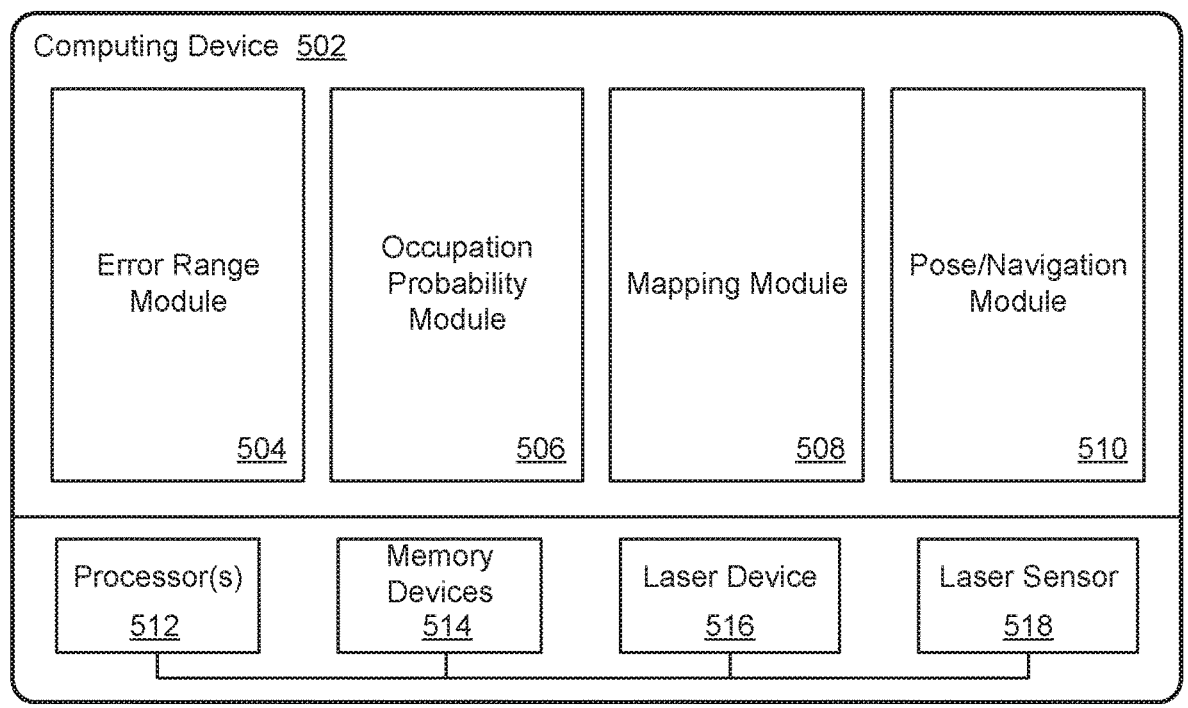
FIG. 5 is a block diagram that illustrates components of an example computing device on which the present technology may be executed.

FIG. 5 illustrates components of an example computing apparatus or device 502 on which the present technology for mapping a physical environment using laser point data and an error range distribution may be executed. The computing apparatus or device 502 can include a LIDAR device, or the computing apparatus or device 502 can include a device that is communicatively connected to LIDAR components, such as a laser device 516 and a laser sensor 518. The computing apparatus or device 502 can include modules configured to map a physical environment and calculate a pose and/or navigate through the physical environment. Illustratively, the computing apparatus or device 502 may be a component of a robot or an autonomous vehicle and the computing apparatus or device 502 may be configured to perform a Simultaneous Localization and Mapping (SLAM) method.

As illustrated, the computing apparatus or device 502 may include a mapping module 508, an error range module 504, an occupation probability module 506, a pose/navigation module 510, and other modules. The mapping module 508 may be configured to generate an environment map representing a physical environment using laser point data generated by a LIDAR device. The mapping module 508 may receive laser point data for laser light detected by a laser sensor 518. The laser sensor 518 detects laser light reflected from a physical environment illuminated with the laser light by a laser device 516. The laser point data may include angles and distances of laser points associated with a laser scan of a physical environment. The laser point data can be aligned to the environment map. In one example, the mapping module 508 may be configured to transform laser point data to transformation points on an environment map using the angles and distances of the laser points.

An environment map can be divided into a number of different locations using grid cells. Each grid cell can be used to identify a location in the environment map. Transformation points aligned to the environment map may be contained within a grid cell. Grid cells containing one or more transformation points can be identified and an occupation probability for the grid cells can be calculated using the occupation probability module 506. An occupation probability may indicate the likelihood that an area represented by a grid cell contains a physical object.

In one example, the mapping module 508 sends a request for occupation probabilities for grid cells included in an environment map to the occupation probability module 506. The occupation probability module 506 may be configured to calculate an occupation probability for the grid cells in an environment map using error ranges for transformation points contained within the grid cells. The occupation probability module 506 can obtain error ranges for transformation points from the error range module 504. In one example, the error range module 504 may be configured to calculate error ranges for transformation points using an error range distribution. An error range distribution may specify a range of distances from a laser sensor 518 to points of distance that are associated with hardware measurement errors, such as an angle measurement error resulting in the distance and angle deviation of a laser point. The error range distribution may specify error ranges for different distances that have been determined to result in hardware measurement error.

A computing apparatus or device 502 can be calibrated using an error range distribution that corresponds to the LIDAR components used to collect laser point data. For example, LIDAR devices that include low cost/low quality components may be more susceptible to hardware errors as compared to LIDAR devices that include higher quality components. Due to differences between LIDAR components, an error range distribution can be determined for a particular configuration of LIDAR components and a computing apparatus or device 502 can be calibrated to use the error range distribution to generate an environment map. For example, the error range module 504 can be configured with an error range distribution that corresponds to a laser device 516 and/or a laser sensor 518 included in the computing apparatus or device 502.

The error range module 504 can calculate an error range for each transformation point on an environment map using the error range distribution. In one example, an error range for a transformation point can be calculated using the coordinates of a transformation point to determine a distance of the transformation point from a laser sensor, and the distance of the transformation point can be used to identify an error range that corresponds to the distance of the transformation point. As described earlier, the distance of an error range can be scaled to an environment map and the error range can be associated with a measurement error (e.g., an angle error and/or a distance error associated with measuring a laser point), such that the error range specifies a point of distance from a laser sensor and specifies a measurement error associated with the point of distance. Error ranges calculated for transformation points using the error range module 504 can be returned to the occupation probability module 506.

Error ranges for transformation points returned to the occupation probability module 506 can be used to select an interpolation technique and adjacent error grid cells used to calculate occupation probabilities for grid cells in the environment map. In one example, a value of an error range for a transformation point can be used to select an interpolation technique and adjacent error grid cells. For example, bilinear interpolation can be used for error ranges that have a measurement error of zero, and bicubic interpolation can be used for error ranges that have a measurement error greater than zero. In a case that bilinear interpolation is selected, error grid cells may be selected using a nearest neighbor technique. In a case that bicubic interpolation is selected, a number of adjacent error grid cells may be determined using a deviation for a transformation point, where the number of the adjacent error cells selected corresponds to the size of the deviation.

The occupation probability module 506 calculates occupation probabilities for grid cells in an environment map using a selected interpolation technique as described in association with FIG. 2. For example, an occupation probability can be calculated for each transformation point included in a grid cell, and the occupation probabilities can be accumulated to form a transformation occupation probability sum (TOPS) for the environment map. This can be performed for each iteration of decreasing a transformation angle. After iterating through the transformation angle to calculate the TOPS for the environment map, the occupation probability module 506 may be configured to select the largest TOPS value for each grid cell included in the environment map. The occupation probabilities for the grid cells can then be returned to the mapping module 508 and the mapping module 508 can be configured to update the grid cells in the environment map with the occupation probabilities.

In one example, the pose/navigation module 510 can be configured to calculate a robot pose or calculate a route through a physical environment using occupation probabilities for grid cells in an environment map. In computer vision and robotics, LIDAR technology can be used to identify objects in a physical environment and determine an object's position and orientation relative to a robot, autonomous vehicle, or the like. Information included in an environment map can be used, for example, to manipulate an object using a robot or to avoid moving into an object by an autonomous vehicle. The pose/navigation module 510 can use the information included in an environment map, including occupation probabilities of grid cells, to compute a robot pose and/or navigate around an object.

Figure 6:
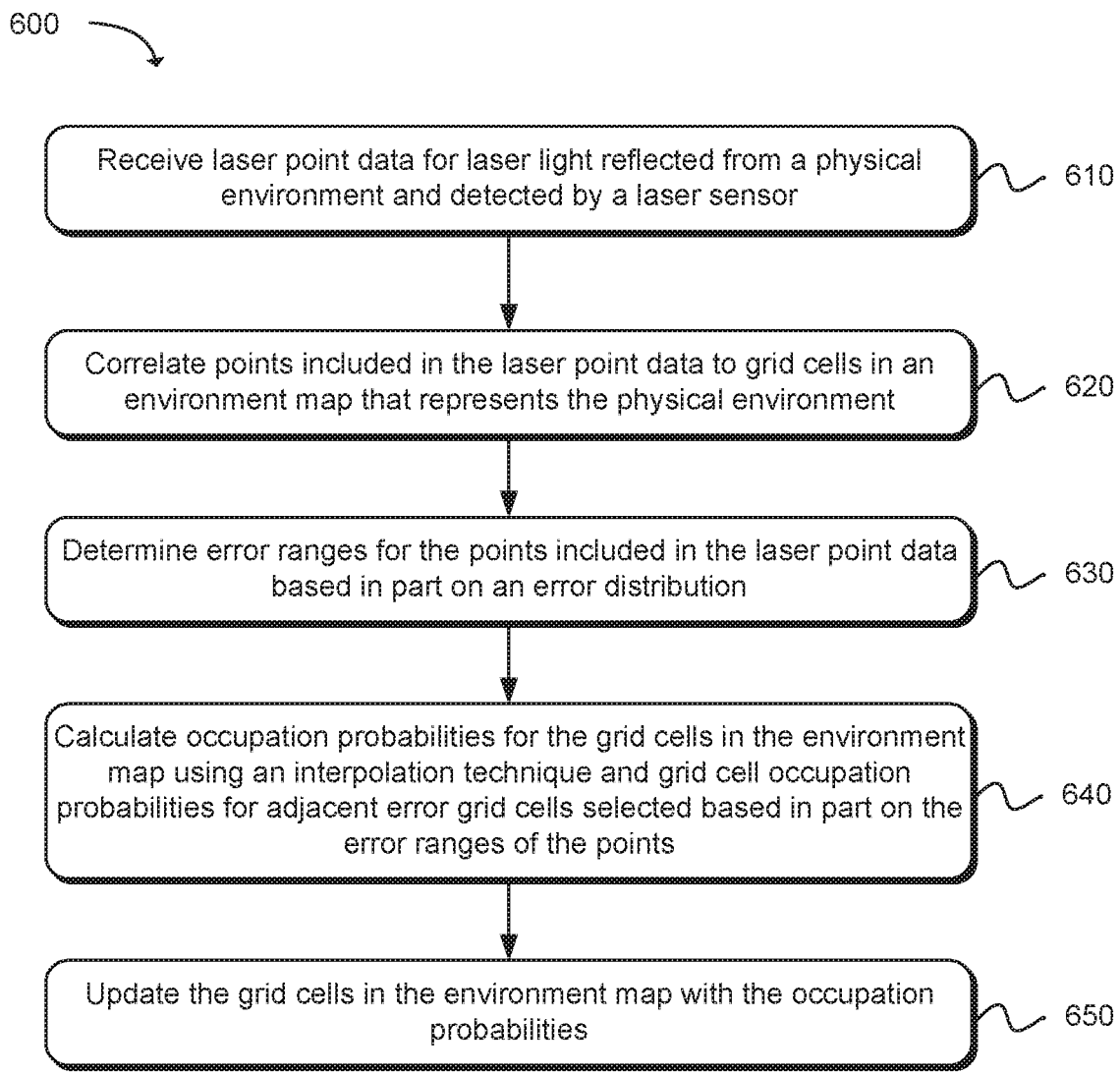
FIG. 6 is a flow diagram illustrating an example method for mapping a physical environment.

FIG. 6 is a flow diagram illustrating an example method 600 for mapping a physical environment. As in block 610, laser point data for laser light reflected from a physical environment may be received. The laser light may be detected using a laser sensor configured to detect the laser light reflected from the physical environment illuminated with the laser light. For example, a LIDAR device can be used to scan the physical environment using a laser and a laser sensor, and laser point data generated by scanning the physical environment may be used to generate and/or update an environment map that represents the physical environment.

As in block 620, points included in the laser point data can be correlated to grid cells in an environment map that represents the physical environment. For example, the laser point data can include point coordinates that correlate to the grid cells in the environment map, and the point coordinates can be converted to transformation points located on the environment map. In one example, a transformation angle can be used to perform scan-to-map matching. The laser point data that correlates to an area within the bounds of the transformation angle can be aligned to the environment map and calculation probabilities can be calculated for grid cells that contain points represented in the laser point data. As described earlier, the transformation angle can be iteratively decreased by a constant value and calculation probabilities for grid cells contained within the bounds of the transformation angle can be calculated for each iteration, until a determination is made that the transformation angle is less than a predefined threshold value, whereupon a top occupation probability sum is selected for each of the grid cells in the environment map.

As in block 630, error ranges for the points included in the laser point data can be determined based in part on an error distribution. For example, an error range can be calculated based in part on an angle error and a distance error associated with a point aligned to the environment map and the error range can be correlated to the error distribution, which may specify a measurement error associated with the error range. As in block 640, occupation probabilities can be calculated for the grid cells in the environment map using an interpolation technique and grid cell occupation probabilities for adjacent error grid cells selected based in part on the error ranges of the points. In one example, error ranges can include a first error range and a second error range, where the first error range includes a distance from a laser sensor to a specified point that marks a beginning of the second error range. The first error range can be associated with bilinear interpolation, which can be used to calculate an occupation probability for grid cells containing points located within the first error range. The second error range can be associated with bicubic interpolation, which can be used to calculate occupation probabilities for grid cells containing points located within the second error range.

In one example, an occupation probability for a grid cell can be calculated for each point contained in the grid cell using an interpolation technique and adjacent error grid cells selected based in part on the error range of the point contained within the grid cell. The occupation probabilities calculated for each point contained within the grid cell can be summed, forming an accumulated occupation probability for the grid cell. Thereafter, a determination may be made that the accumulated occupation probability is greater than a current accumulated occupation probability for the environment map, and the current occupation probability for the grid cell can be replaced with the occupation probability.

After calculating the occupation probabilities for the grid cells in the environment map, as in block 650, the grid cells can be updated with the occupation probabilities. Illustratively, a pose can be calculated based on the occupation probabilities for the grid cells in the environment map, and the pose can be used to position and orientate an autonomous machine, such as a robot or car.

Figure 7:
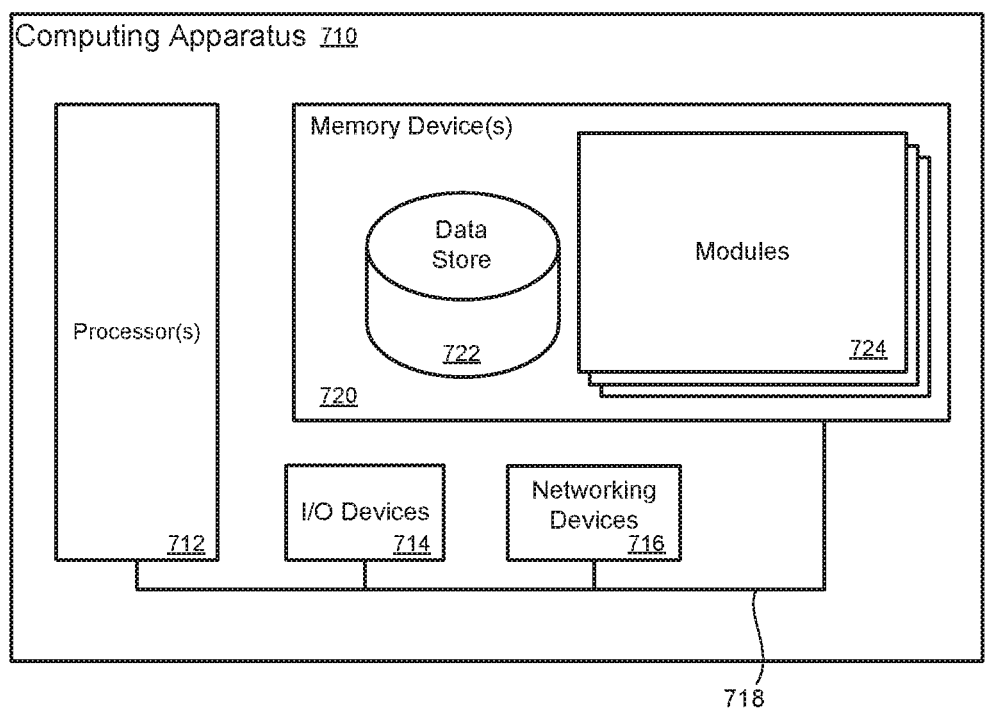
FIG. 7 is block diagram illustrating an example of a computing apparatus that may be used to execute a method for mapping a physical environment.

FIG. 7 illustrates a computing apparatus or device 710 on which modules of this technology may execute. A computing apparatus or device 710 is illustrated on which a high level example of the technology may be executed. The computing apparatus or device 710 may include one or more processors 712 that are in communication with memory devices 720. The computing apparatus or device 710 may include a local communication interface 718 for the components in the computing apparatus or device. For example, the local communication interface 718 may be a local data bus and/or any related address or control busses as may be desired.

The memory device 720 may contain modules 724 that are executable by the processor(s) 712 and data for the modules 724. For example, the memory device 720 can include a mapping module, an error range module, an occupation probability module, a pose/navigation module, and other modules. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high level programming languages that are compiled, interpreted or executed using a hybrid of the methods.

The computing apparatus or device 710 may also have access to I/O (input/output) devices 714 that are usable by the computing device 710. Other known I/O devices may be used with the computing device 710 as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described herein may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices and systems described herein may also contain communication connections or networking apparatus and networking connections that allow the devices and systems to communicate with other devices and/or systems. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Examples

The following examples pertain to specific invention embodiments and point out specific features, elements, or steps that can be used or otherwise combined in achieving such embodiments.

In one example there is provided an apparatus for mapping a physical environment, the apparatus comprising, a laser configured to illuminate the physical environment with laser light, a laser sensor configured to detect the laser light reflected from the physical environment, one or more processors and memory configured to receive laser point data from the laser sensor, correlate points included in the laser point data to grid cells included in an environment map that represents the physical environment, determine error ranges for the points correlated to the grid cells based in part on an error distribution, calculate occupation probabilities for the grid cells in the environment map using an interpolation technique and grid cell occupation probabilities for adjacent error grid cells selected based in part on the error ranges of the points, and update the grid cells in the environment map with the occupation probabilities.

In one example of an apparatus, the one or more processors and memory are further configured to calculate an error range based in part on an angle error and a distance error associated with a point.

In one example of an apparatus, the error ranges include a first error range and a second error range, wherein the first error range includes a distance from the laser sensor to a specified point that marks a beginning of the second error range.

In one example of an apparatus, bilinear interpolation is used to calculate an occupation probability for a grid cell containing a point associated with the first error range.

In one example of an apparatus, the adjacent error grid cells used to calculate an occupation probability for a grid cell containing a point associated with the first error range are identified using a nearest neighbors technique.

In one example of an apparatus, bicubic interpolation is used to calculate occupation probabilities for the grid cells containing points that have error ranges that are in the second error range.

In one example of an apparatus, the adjacent error grid cells used to calculate an occupation probability for a grid cell containing a point associated with the second error range are identified using a deviation for the point, wherein a number of the adjacent error grid cells selected corresponds to a size of the deviation.

In one example of an apparatus, a distance deviation and an angle deviation are used to select the number of the adjacent error grid cells used to calculate the occupation probability for the grid cell.

In one example of an apparatus, the one or more processors and memory are further configured to initialize a transformation angle, and rotate the laser point data through the transformation angle and correlate the points in the laser point data to the environment map.

In one example of an apparatus, the one or more processors and memory are further configured to, calculate for each point contained within a grid cell, an occupation probability for the grid cell using an interpolation technique and adjacent error grid cells selected based in part on the error range of the point contained within the grid cell, sum the occupation probabilities calculated for each point contained within the environment map forming an accumulated occupation probability for the environment map; determine that the accumulated occupation probability is greater than a current accumulated occupation probability for the environment map, and replacing the current occupation probability for the grid cell with the occupation probability corresponding to a largest accumulated occupation probability for the environment map.

In one example of an apparatus, the one or more processors and memory are further configured to decrease the transformation angle by a constant value, wherein after decreasing the transformation angle, an iteration of calculating the occupation probabilities for the grid cells located within an area of the environment map is performed.

In one example of an apparatus, the apparatus further comprises, determining that the transformation angle is larger than a predefined threshold value; and providing the occupation probabilities for the grid cells in the environment map.

In one example of an apparatus, the apparatus further comprises calculating a pose based on the occupation probabilities for the grid cells in the environment map.

In one example there is provided, a computer implemented method for mapping a physical environment, comprising, receiving laser point data for laser light from a laser sensor, wherein the laser sensor is configured to detect the laser light reflected from the physical environment illuminated with the laser light and generate the laser point data; determining error ranges for the points included in the laser point data based in part on an error distribution, using the one or more processors, wherein an error range is a distance from the laser sensor that is associated with a measurement error of a point and the error range is distributed to grid cells in the environment map; calculating top occupation probability sums for the environment map, using the one or more processors, wherein the laser point data is rotated through a transformation angle and the laser point data is correlated to an environment map that represents the physical environment, wherein the environment map includes the grid cells and the laser point data correlates to points contained within the grid cells, wherein for each point contained within a grid cell, an occupation probability for the grid cell is calculated using an interpolation technique and adjacent error grid cells selected based in part on the error range of the point contained within the grid cell, wherein occupation probabilities calculated for each point contained within the grid cell are summed to form an accumulated occupation probability for the environment map, wherein the accumulated occupation probability for the environment map is calculated for each rotation of the laser point data and the accumulated occupation probability that is greater than other accumulated occupation probabilities for environment map is selected as a top occupation probability sum for the environment map, and updating the grid cells in the environment map with the occupation probabilities corresponding to the top occupation probability sum, using the one or more processors.

In one example the computer implemented method further comprises initializing the transformation angle used to identify the grid cells in the environment map, wherein the laser point data includes coordinates that correlate to the grid cells and the laser point data is aligned to the environment map.

In one example the computer implemented method further comprises rotating the points through the transformation angle by a constant value after each iteration of calculating the accumulated occupation probability for the environment map.

In one example the computer implemented method further comprises determining that the transformation angle is larger than a predefined threshold value and select the top occupation probability sum for the environment map.

In one example there is provided, a non-transitory machine readable storage medium having instructions embodied thereon, the instructions when executed by one or more processors, receive laser point data for laser light reflected from a physical environment and detected by a laser sensor, correlate the laser point data to an environment map that represents the physical environment, wherein the environment map includes grid cells and the laser point data is correlated to the grid cells in the environment map, obtain error range data for a distribution of error ranges associated with measurement errors of points included in the laser point data, wherein the error ranges are distances from the laser sensor that are associated with measurement errors of the points included in the laser point data, calculate the error ranges for the points included in the laser point data using the error range data, calculate occupation probabilities for the grid cells in the environment map using an interpolation technique and grid cell occupation probabilities for adjacent error grid cells selected based in part on the error ranges of the points, and update the grid cells in the environment map with the occupation probabilities.

In one example of a non-transitory machine readable storage medium, the instructions that when executed by the processor further calculate an occupation probability for a grid cell associated with an error range of zero using bilinear interpolation.

In one example of a non-transitory machine readable storage medium, the instructions that when executed by the processor further calculate an occupation probability for a grid cell associated with an error range greater than zero using bicubic interpolation.

In one example of a non-transitory machine readable storage medium, the instructions that when executed by the processor further select the points represented in the laser point data having coordinates that correspond to an area of the environment map.

In one example of a non-transitory machine readable storage medium, a transformation angle is iteratively decreased by a constant value after calculating the occupation probabilities for the grid cells.

In one example of a non-transitory machine readable storage medium, for each point contained within a grid cell, the occupation probability for the grid cell is calculated and the occupation probabilities calculated for each point contained within the grid cell are summed to form an accumulated occupation probability for the environment map.

In one example of a non-transitory machine readable storage medium, the accumulated occupation probability for the environment map is calculated for multiple transformation angles and the accumulated occupation probability that is greater than other accumulated occupation probabilities for the environment map is selected and a corresponding occupation probability is selected as the occupation probability for the grid cell.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus for mapping a physical environment, the apparatus comprising:
   a laser configured to illuminate the physical environment with laser light;
   a laser sensor configured to detect the laser light reflected from the physical environment; and
   one or more processors and memory configured to:
      receive laser point data from the laser sensor;
      initialize a transformation angle;
      rotate the laser point data through the transformation angle and correlate points included in the laser point data to grid cells included in an environment map that represents the physical environment;
      determine error ranges for the points correlated to the grid cells based in part on an error distribution;
      calculate for each point contained within a grid cell, an occupation probability for the grid cell in the environment map using an interpolation technique and adjacent error grid cells selected based in part on the error range of the point contained within the grid cell;
      sum the occupation probabilities calculated for each point contained within the environment map forming an accumulated occupation probability for the environment map;
      determine that the accumulated occupation probability is greater than a current accumulated occupation probability for the environment map;
      replace the current occupation probability for the grid cell with the occupation probability corresponding to a largest accumulated occupation probability for the environment map; and
      update the grid cells in the environment map with the occupation probabilities.

2. The apparatus of claim 1, wherein the one or more processors and memory are further configured to calculate an error range based in part on an angle error and a distance error associated with a point.

3. The apparatus of claim 1, wherein the error ranges include a first error range and a second error range, wherein the first error range includes a distance from the laser sensor to a specified point that marks a beginning of the second error range.

4. The apparatus of claim 3, wherein the one or more processors and memory are further configured to calculate an occupation probability for a grid cell containing a point associated with the first error range, based on bilinear interpolation.

5. The apparatus of claim 3, wherein the one or more processors and memory are further configured to identify the adjacent error grid cells used to calculate an occupation probability for a grid cell containing a point associated with the first error range, based on a nearest neighbors technique.

6. The apparatus of claim 3, wherein the one or more processors and memory are further configured to calculate occupation probabilities for the grid cells containing points that have error ranges that are in the second error range, based on bicubic interpolation.

7. The apparatus of claim 3, wherein the one or more processors and memory are further configured to identify the adjacent error grid cells used to calculate an occupation probability for a grid cell containing a point associated with the second error range, based on a deviation for the point, wherein a number of the adjacent error grid cells selected corresponds to a size of the deviation.

8. The apparatus of claim 7, wherein the one or more processors and memory are further configured to select the number of the adjacent error grid cells used to calculate the occupation probability for the grid cell, based on a distance deviation and an angle deviation.

9. The apparatus of claim 1, wherein the one or more processors and memory are further configured to:
   decrease the transformation angle by a constant value; and
   after decreasing the transformation angle, perform an iteration of calculating the occupation probabilities for the grid cells located within an area of the environment map.

10. The apparatus of claim 1, wherein the one or more processors and memory are further configured to:
    determine that the transformation angle is larger than a predefined threshold value; and
    provide the occupation probabilities for the grid cells in the environment map.

11. The apparatus of claim 1, wherein the one or more processors and memory are further configured to calculate a pose based on the occupation probabilities for the grid cells in the environment map.

12. A computer implemented method for mapping a physical environment, comprising:
    receiving laser point data for laser light from a laser sensor, wherein the laser sensor is configured to detect the laser light reflected from the physical environment illuminated with the laser light and generate the laser point data;
    determining error ranges for the points included in the laser point data based in part on an error distribution, using one or more processors, wherein an error range is a distance from the laser sensor that is associated with a measurement error of a point and the error range is distributed to grid cells in the environment map;
    calculating top occupation probability sums for the environment map, using the one or more processors,
    wherein the laser point data is rotated through a transformation angle and the laser point data is correlated to an environment map that represents the physical environment, wherein the environment map includes the grid cells and the laser point data correlates to points contained within the grid cells,
    wherein for each point contained within a grid cell, an occupation probability for the grid cell is calculated using an interpolation technique and adjacent error grid cells selected based in part on the error range of the point contained within the grid cell,
    wherein occupation probabilities calculated for each point contained within the grid cell are summed to form an accumulated occupation probability for the environment map,
    wherein the accumulated occupation probability for the environment map is calculated for each rotation of the laser point data and the accumulated occupation probability that is greater than other accumulated occupation probabilities for environment map is selected as a top occupation probability sum for the environment map; and
    updating the grid cells in the environment map with the occupation probabilities corresponding to the top occupation probability sum, using the one or more processors.

13. The method of claim 12, further comprising initializing the transformation angle used to identify the grid cells in the environment map, wherein the laser point data includes coordinates that correlate to the grid cells and the laser point data is aligned to the environment map.

14. The method of claim 12, further comprising rotating the points through the transformation angle by a constant value after each iteration of calculating the accumulated occupation probability for the environment map.

15. The method of claim 14, further comprising determining that the transformation angle is larger than a predefined threshold value and select the top occupation probability sum for the environment map.

16. A non-transitory machine readable storage medium having instructions embodied thereon, the instructions when executed by one or more processors, cause the one or more processors to:
  receive laser point data for laser light reflected from a physical environment and detected by a laser sensor;
  correlate the laser point data to an environment map that represents the physical environment, wherein the environment map includes grid cells and the laser point data is correlated to the grid cells in the environment map;
  obtain error range data for a distribution of error ranges associated with measurement errors of points included in the laser point data, wherein the error ranges are distances from the laser sensor that are associated with measurement errors of the points included in the laser point data;
  calculate the error ranges for the points included in the laser point data using the error range data;
  calculate, for each point contained within a grid cell, an occupation probability for the grid cell in the environment map using an interpolation technique and grid cell occupation probabilities for adjacent error grid cells selected based in part on the error ranges of the points;
  sum the occupation probabilities calculated for each point contained within the grid cell to form an accumulated occupation probability for the environment map;
  calculate the accumulated occupation probability for the environment map for multiple transformation angles;
  select the accumulated occupation probability that is greater than other accumulated occupation probabilities for the environment map;
  select a corresponding occupation probability as the occupation probability for the grid cell; and
  update the grid cells in the environment map with the occupation probabilities.

17. A non-transitory machine readable storage medium as in claim 16, wherein the instructions, when executed by the one or more processors, further cause the one or more processors to calculate an occupation probability for a grid cell associated with an error range of zero using bilinear interpolation.

18. A non-transitory machine readable storage medium as in claim 16, wherein the instructions, when executed by the one or more processors, further cause the one or more processors to calculate an occupation probability for a grid cell associated with an error range greater than zero using bicubic interpolation.

19. A non-transitory machine readable storage medium as in claim 16, wherein the instructions, when executed by the one or more processors, further cause the one or more processors to iteratively decrease a transformation angle by a constant value after calculating the occupation probabilities for the grid cells.

* * * * *